US012804284B2

(12) United States Patent
Jin et al.

(10) Patent No.: US 12,804,284 B2
(45) Date of Patent: Nov. 17, 2026

(54) INDIVIDUAL SPAD PIXEL CONTROL FOR MITIGATING HOT PIXELS AND REDUCING POWER CONSUMPTION

(71) Applicant: Microsoft Technology Licensing, LLC, Redmond, WA (US)

(72) Inventors: Rui Jin, Mountain View, CA (US); Minseok Oh, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 18/827,522

(22) Filed: Sep. 6, 2024

(65) Prior Publication Data

US 2026/0075335 A1 Mar. 12, 2026

(51) Int. Cl.
*H04N 25/766* (2023.01)
*H04N 25/78* (2023.01)

(52) U.S. Cl.
CPC .......... *H04N 25/766* (2023.01); *H04N 25/78* (2023.01)

(58) Field of Classification Search
CPC ............................ H04N 25/766; H04N 25/78
See application file for complete search history.

(56) References Cited

U.S. PATENT DOCUMENTS

2016/0020237 A1* 1/2016 Yamakawa ........... H04N 25/63 257/233
2021/0409625 A1* 12/2021 Zhu ....................... H04N 25/47

* cited by examiner

*Primary Examiner* — Twyler L Haskins
*Assistant Examiner* — Surafel Yilmakassaye
(74) *Attorney, Agent, or Firm* — Workman Nydegger

(57) ABSTRACT

An image sensor includes: a plurality of image sensor pixels arranged to form a sensor array; one or more addressing lines connected to the plurality of image sensor pixels to facilitate selection of one or more image sensor pixels of the plurality of image sensor pixels for readout; and one or more bit lines connected to the plurality of image sensor pixels to facilitate communication of sensor data during readout. At least one image sensor pixel includes: a photodiode; one or more recharge components; readout circuitry; a switch configured to enable or disable the at least one image sensor pixel; and a switch memory configured to store a value that controls whether the switch enables or disables the at least one image sensor pixel.

18 Claims, 10 Drawing Sheets

INDIVIDUAL SPAD PIXEL CONTROL FOR MITIGATING HOT PIXELS AND REDUCING POWER CONSUMPTION

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras for facilitating image capture, video capture, and/or other functions. For instance, cameras of an MR system may utilize images and/or depth information obtained using the camera (s) to provide pass-through views of a user's environment to the user. An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time-of-flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

A pass-through view can aid users in avoiding disorientation and/or safety hazards when transitioning into and/or navigating within a mixed-reality environment. Pass-through views may also enhance user views in low visibility environments. For example, mixed-reality systems configured with long wavelength thermal imaging cameras may facilitate visibility in smoke, haze, fog, and/or dust. Likewise, mixed-reality systems configured with low light imaging cameras facilitate visibility in dark environments where the ambient light level is below the level required for human vision.

MR systems utilize various types of image sensors with various types of semiconductor photodetectors for capturing pass-through imagery and/or other purposes. Some image sensors used in MR systems utilize complementary metal-oxide-semiconductor (CMOS) photodetectors. For example, CMOS image sensors may include image sensor pixel arrays where each pixel is configured to generate electron-hole pairs in response to detected photons. The electrons may become stored in per-pixel capacitors, and the charge stored in the capacitors may be read out to provide image data (e.g., by converting the stored charge to a voltage).

Some image sensors used in MR systems utilize single photon avalanche diode (SPAD) photodetectors. A SPAD pixel is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to detect an avalanche and to result in a binary output. The binary output may comprise a "1" where an avalanche event was detected during an exposure (e.g., where a photon was detected), or a "0" where no avalanche event was detected.

Separate shutter operations may be performed consecutively and integrated over a frame capture time period. The binary output of the consecutive shutter operations over a frame capture time period may be counted, and an intensity value may be calculated based on the counted binary output. An array of SPADs may form an image sensor, with each SPAD forming a separate pixel in the SPAD array. To capture an image of an environment, each SPAD pixel may detect avalanche events and provide binary output for consecutive shutter operations in the manner described herein. The per-pixel binary output of consecutive shutter operations over a frame capture time period may be counted, and per-pixel intensity values may be calculated based on the counted per-pixel binary output. The per-pixel intensity values may be used to form an intensity image of an environment.

A key source of noise in CMOS and SPAD imagery when imaging under low light conditions is dark current noise. There is an ongoing need and desire for improvements to the image quality of CMOS and SPAD imagery, particularly for imagery captured under low light conditions where dark current noise can be prevalent. The presence of dark current noise in captured imagery can affect various operations associated with MR experiences, such as pass-through imaging, late stage reprojection, rolling shutter corrections, object tracking (e.g., hand tracking), surface reconstruction, semantic labeling, 3D reconstruction of objects, and/or others.

The subject matter claimed herein is not limited to embodiments that solve any challenges or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
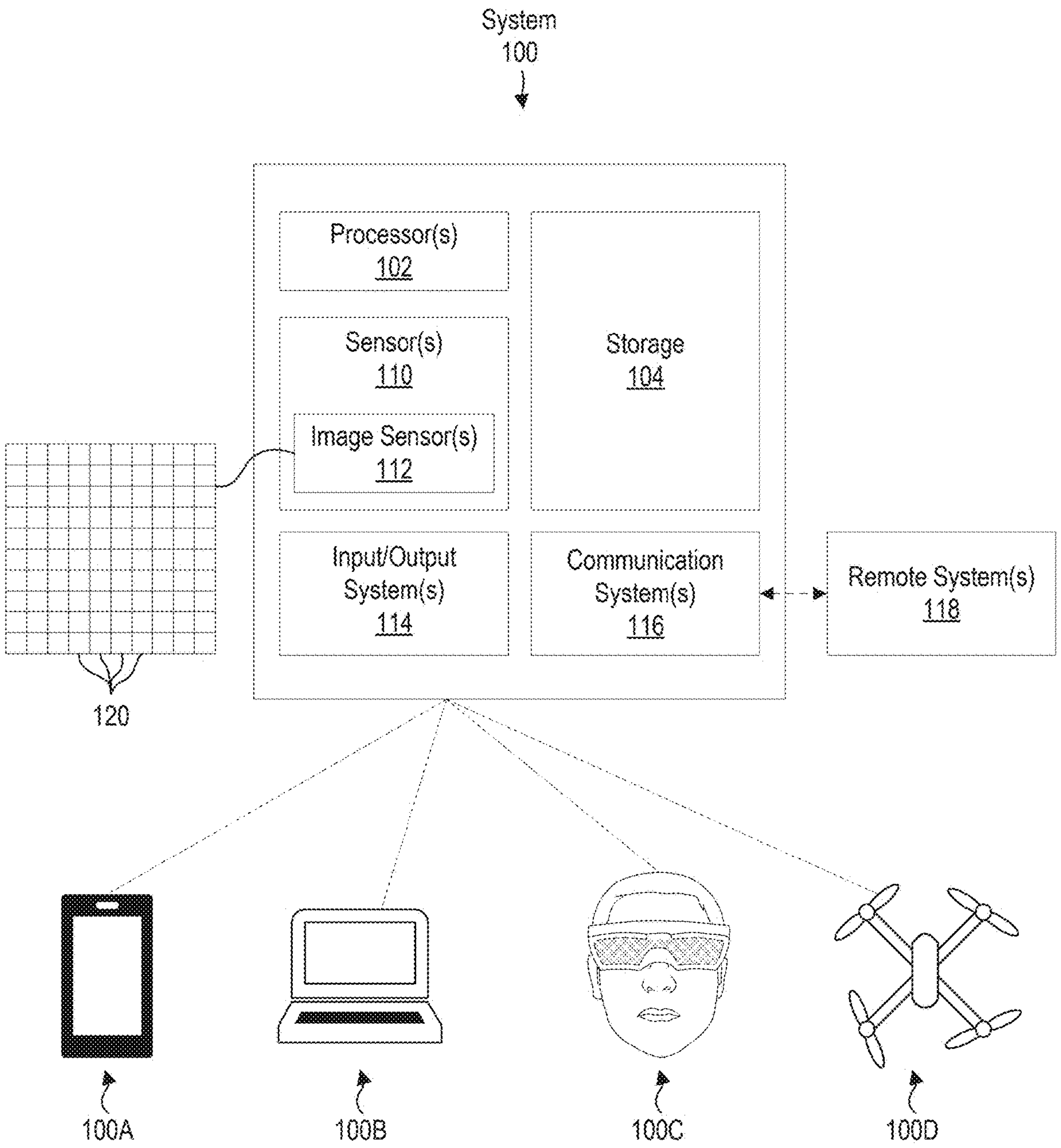
FIG. 1 illustrates example components of an example system that may include or be used to implement one or more disclosed embodiments.

Disclosed embodiments are generally directed to image sensors with individually controllable pixels for mitigating hot pixels and reducing power consumption.

Examples of Technical Benefits, Improvements, and Practical Applications

Those skilled in the art will recognize, in view of the present disclosure, that at least some of the disclosed embodiments may be implemented to address various shortcomings associated with at least some conventional imaging systems, particularly for imaging under low light conditions. The following section outlines some example improvements and/or practical applications provided by the disclosed embodiments. It will be appreciated, however, that the following are examples only and that the embodiments described herein are in no way limited to the example improvements discussed herein.

As noted above, there is an ongoing need and desire for improvements to the image quality of CMOS and SPAD imagery, particularly for SPAD imagery captured under low light conditions where dark current noise can be prevalent. Dark current (sometimes referred to as reverse bias leakage current) refers to a small electric current that flows through photosensitive devices (e.g., CMOS or SPAD image sensors) even when no photons are entering the device. Dark current can be thermally induced or brought about by crystallographic and/or manufacturing irregularities and/or defects that may arise from silicon processing and that may remain even after annealing.

In SPAD image sensors, dark current can cause one or more electron-hole pairs to be generated in the depletion region and can trigger avalanche events, even when no photons are detected/present. Avalanche events brought about by dark current are typically counted as detected photons, which can cause the binary output of a SPAD to include false counts (or "dark counts"). In SPAD imagery, dark counts can cause the intensity values assigned to at least some SPAD pixels to be inaccurately high, and can add dark current noise (e.g., random spatio-temporal noise) to SPAD imagery, which can degrade user experiences. Furthermore, dark current-induced avalanche events in one pixel can trigger optical cross-talk, where avalanche events are also triggered in neighboring pixels. Pixels or groups of pixels that give rise to dark counts are referred to as hot pixels or clusters or faulty pixels or clusters. In some instances, the effects of dark current noise are prominent when imaging under low light conditions.

Additionally, SPAD image sensors are associated with higher power consumption than standard CMOS image sensors due to the amount of energy used to recharge each SPAD (i.e., $C\Delta V^2$, where C is the capacitance of the SPAD and $\Delta V$ is the bias voltage). Hot pixels thus cause higher power consumption because of repeated recharging following each dark current induced avalanche event.

Various techniques exist for compensating for dark current noise in CMOS and SPAD imagery. Such techniques can include obtaining a dark current data (e.g., dark current imagery) that indicates the location of image sensor pixels that generate dark current (e.g., hot pixels or hot clusters). The dark current data can additionally indicate the magnitude or severity of dark current generated by pixels of an image sensor. For instance, the dark current data can include dark count signals for various pixels, indicating the quantity of dark counts generated by the pixel(s).

Dark current data may be obtained during a calibration operation (e.g., via automatic test equipment associated with manufacture, or after shipping of the image sensor), such as by blocking light from reaching the image sensor and performing sensor readouts to determine dark count signals for the pixels of the image sensor. Dark current data can additionally or alternatively be obtained based on imagery captured during end use of the image sensor, such as by performing template matching using captured imagery to localize hot pixels and/or quantify dark count signals for the hot pixels. The dark current data can be used during end use to modify images captured using the image sensor to compensate for dark current, such as by performing a subtraction operation that subtracts the dark current data from the captured imagery.

However, even when dark current compensation operations are implemented, at least some dark current noise may persist in captured imagery. Furthermore, image processing-based techniques for compensating for dark current fail to address the increased power consumption brought about by hot pixels.

At least some disclosed embodiments are directed to implementing switches for individual pixels of an image sensor (e.g., a SPAD image sensor) that are configured to enable or disable the individual pixels of the image sensor. Each switch can be controlled by switch memory that stores a value indicating whether to enable or disable the associated pixel. In some implementations, the switch memory is non-volatile or one-time programmable memory. Under such configurations, the value indicating whether the enable or disable the pixel can be set under test conditions. For example, as part of image sensor production, a dark current signal may be measured for an individual pixel and assessed relative to a threshold. The threshold can be determined based on the expected signal level in a low light scenario (e.g., low light scenarios in which the image sensor is expected to be used). If the individual pixel has a dark current signal that satisfies the threshold (e.g., meets or exceeds the threshold), a value may be set in the non-volatile switch memory for that pixel to cause the pixel to become disabled (e.g., permanently). This can prevent the pixel from contributing to dark current noise when imaging in low light scenarios.

In some implementations, the switch memory is volatile or re-programmable. Under such configurations, the value indicating whether to enable or disable the pixel can be set based on end use conditions. For example, a dark count signal may be accessed for an individual pixel. The dark count signal may be based on information acquired as part of image sensor calibration actions and/or based on imagery captured during end use of the image sensor (e.g., via template matching or other image signal processing techniques). A photon signal may also be accessed for a given end use scenario of the image sensor. For example, the photon signal may be determined based on ambient light conditions, which may be indicated by a light sensor (e.g., a single pixel camera), gain applied by an image sensor, etc. The dark count signal may be compared to the photon signal to inform when to selectively enable or disable the individual pixel. For instance, when the dark count signal exceeds the photon signal, the switch memory may be programmed with a value that causes the switch to selectively disable the pixel. In contrast, when the photon signal exceeds the dark count signal, the switch memory may be programmed with a value that causes the switch to selectively enable the pixel. The switch memory of the pixel may be programmed via a centralized memory of the image sensory, which may communicate with the switch memory via addressing lines (e.g., column or row select lines) and/or bit lines (e.g., for receiving readout data from the pixel).

An individual pixel of an image sensor may be selectively enabled or disabled based on additional or alternative criteria, such as whether the pixel is representing part of a captured scene that aligns with a region of interest (ROI) for a user. A region of interest may be measured in various ways, such as via eye tracking techniques, gesture input (e.g., where the user is pointing), etc. and can be mapped to pixels of the image sensor. When a given pixel (e.g., known to be a hot pixel) is determined to be outside of an ROI, the pixel may be selectively disabled. In contrast, when the pixel is determined to be inside of an ROI, the pixel may be selectively enabled.

Another example criterion for determining whether to selectively enable or disable an individual pixel of an image sensor can include the brightness of the part of the captured scene represented by the individual pixel. Local brightness for a region of a captured scene can be determined via image signal processing techniques such as thresholding, region-based averaging, local histogram analysis, and/or others. Often, image resolution can be reduced in bright portions of a scene without degrading user experiences. Accordingly, in some instances, when a given pixel (e.g., known to be a hot pixel) is determined to represent a bright portion of a captured scene, the pixel may be selectively disabled. In contrast, when the pixel is determined to not represent a bright portion of a capture scene, the pixel may be selectively enabled.

Various example criteria for selectively enabling or disabling individual pixels of an image sensor may be combined or used in conjunction with one another, such as by implementing a hierarchy of rules based on the various criteria (e.g., where the ROI criterion is gated by the comparison of the dark count signal with the photon signal and/or by the determination of local brightness).

By disabling individual pixels of image sensors as described herein, the amount and/or severity of dark current noise caused by hot pixels can be reduced, which can improve the quality and/or interpretability of captured imagery. Further, disabling individual pixels can mitigate the effects that hot pixels can have on overall power consumption of an image sensor, which can contribute to improved device performance (e.g., reduced heat, increased battery life, etc.).

Although the present disclosure focuses, in at least some respects, on examples that include SPAD sensors (e.g., SPAD sensor(s) implemented on an HMD), at least some principles disclosed herein may be applied to other types of image sensors.

Although various examples discussed herein focus, in at least some respects, on image sensor configurations for implementation on MR systems or other types of HMDs, the image sensor configurations discussed herein may be utilized in conjunction with other types of devices, such as security systems, automotive systems, machine vision systems, and/or other types of devices.

Having just described some of the various high-level features and benefits of the disclosed embodiments, attention will now be directed to the Figures, which illustrate various conceptual representations, architectures, methods, and supporting illustrations related to the disclosed embodiments.

Example Systems, Components, and Image Sensor Configurations

FIG. 1 illustrates various example components of a system 100 that may be used to implement one or more disclosed embodiments. For example, FIG. 1 illustrates that a system 100 may include processor(s) 102, storage 104, sensor(s) 110, image sensor(s) 112, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise computer-readable recording media and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some instances, the system may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more image sensors, microphones, thermometers, barometers, magnetometers, accelerometers, gyroscopes, and/or others.

FIG. 1 also illustrates that the sensor(s) 110 may include image sensor(s) 112. As depicted in FIG. 1, image sensor(s) 112 may comprise an arrangement of image sensor pixels 120 that form a sensor array (e.g., a pixel array or focal plane array) and are each configured to detect photons to facilitate image capture. For instance, where the image sensor(s) 112 comprise one or more SPAD sensors, the image sensor pixels 120 may facilitate avalanche events in response to sensing a photon, as described hereinabove. After detecting a photon, the image sensor pixels 120 may be recharged to prepare the image sensor pixels 120 for detecting additional avalanche events. Image sensor(s) 112 may be implemented on a system 100 (e.g., an MR HMD) to facilitate various functions such as, by way of non-limiting example, image capture and/or computer vision tasks.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices. Although the present description focuses, in at least some respects, on utilizing an HMD to implement embodiments of the present disclosure, additional or alternative types of systems may be used.

Figure 2:
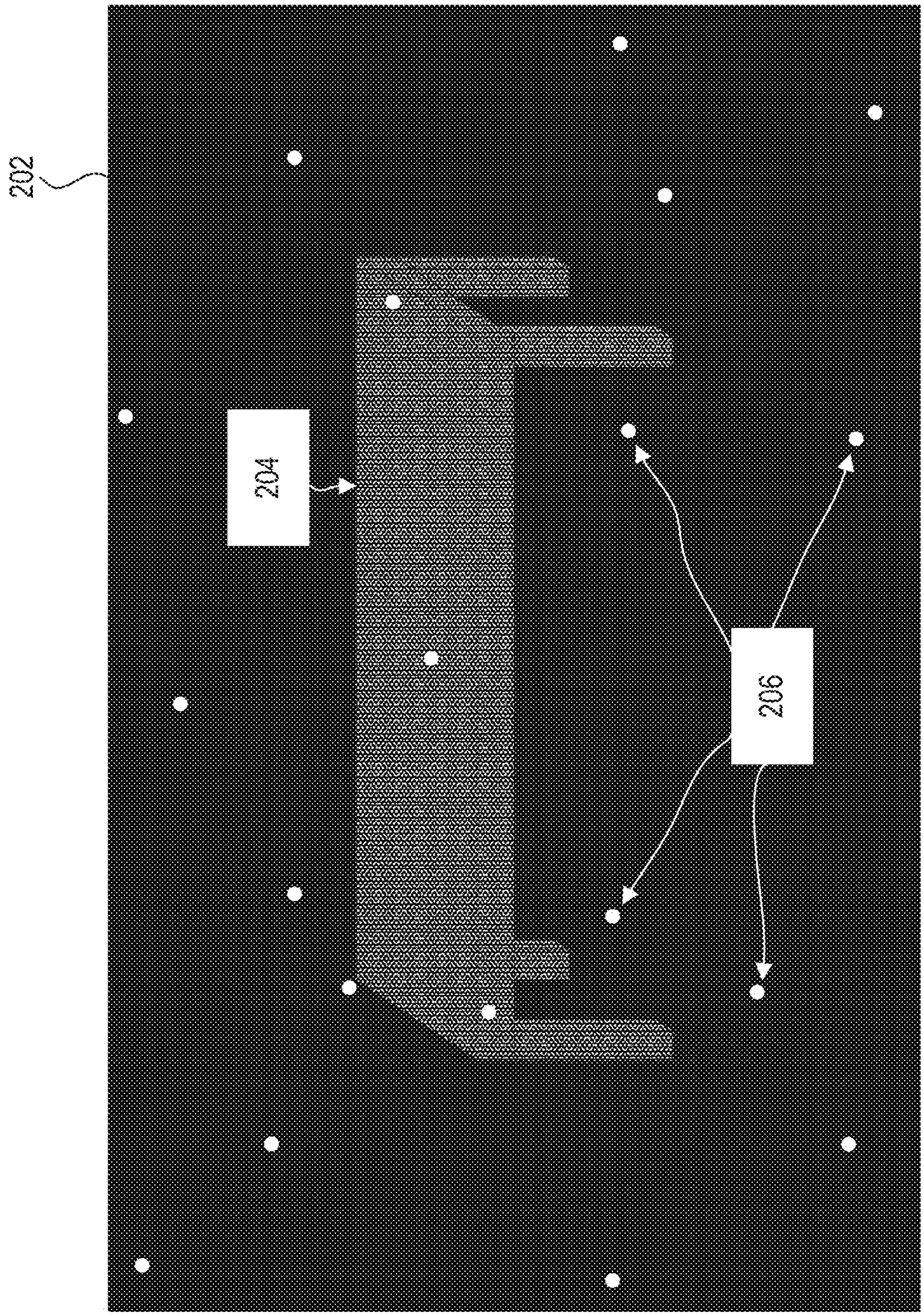
FIG. 2 illustrates an example depiction of an image captured under low light conditions where hot pixels give rise to dark current noise.

FIG. 2 illustrates an example depiction of an image 202 captured under low light conditions using a SPAD image sensor. The image 202 captures a scene or environment that includes a table 204. As illustrated in FIG. 2, the image 202 includes dark current noise 206 introduced by dark counts read out from hot pixels of the SPAD image sensor. The dark current noise 206 can decrease image quality and/or interpretability and can therefore degrade device operation and/or user experiences. Furthermore, the repeated recharging of the hot pixels after each dark-current-induced dark count can increase power consumption of the SPAD image sensor.

As disclosed herein, individual pixels of an image sensor may be deactivated (e.g., permanently or selectively) to at least partially mitigate dark current noise in captured imagery and/or to at least partially mitigate excess power consumption.

FIGS. 3A through 3D illustrate example diagrams showing components that can be implemented for individual image sensor pixels 120 of an image sensor 112. Such components can enable the individual image sensor pixels 120 to be selectively enabled or disabled based on conditions during end use of the image sensor 112. As noted above, the image sensor 112 can be implemented on various types of systems, such as a standalone camera, a mixed-reality head-mounted display 100C, an aerial vehicle 100D or other type of vehicle, and/or others.

Figure 3A:
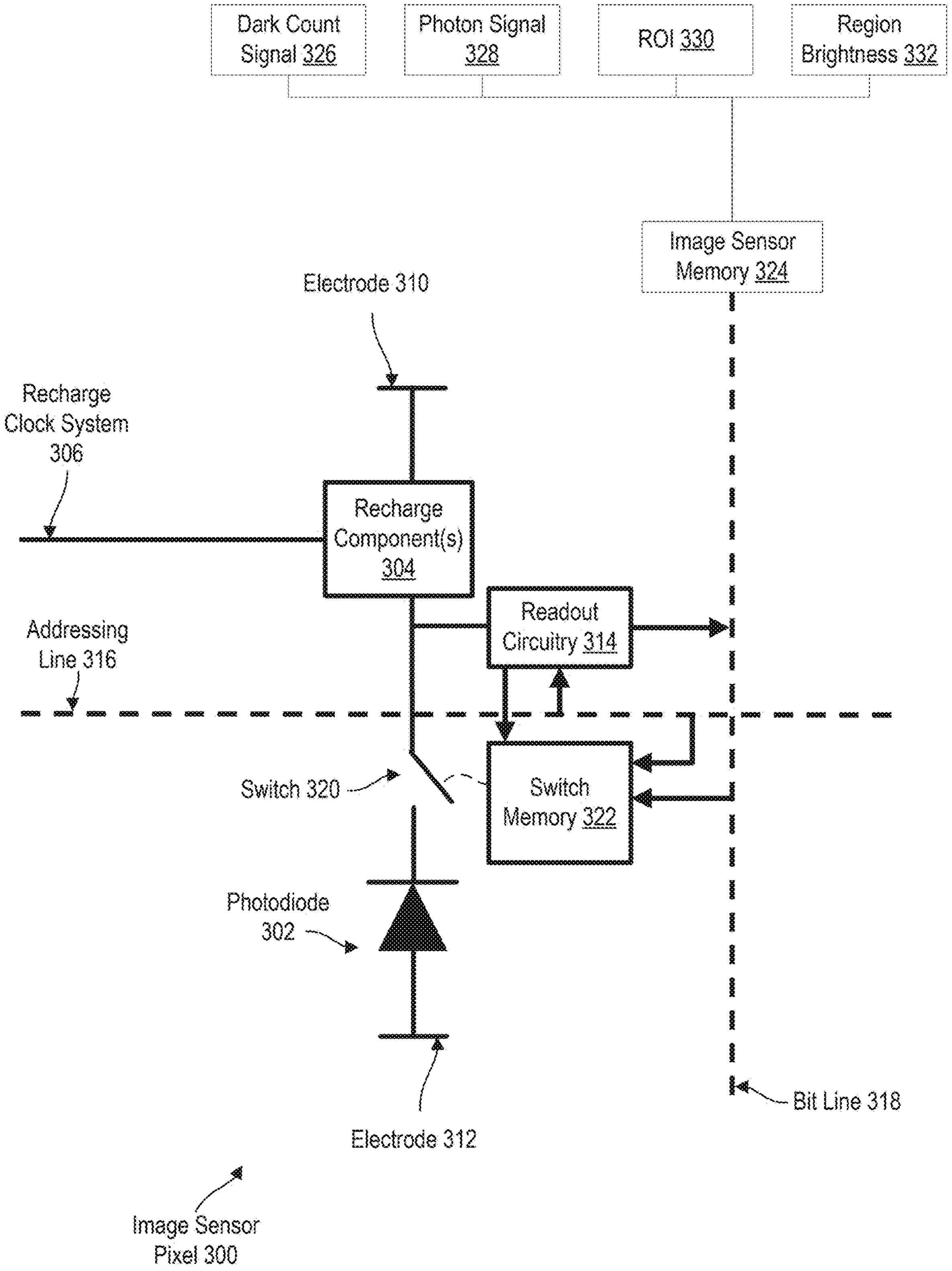
FIGS. 3A through 3D illustrate example diagrams showing components of image sensor pixels of an image sensor that can be selectively enabled or disabled based on conditions during use of the image sensor.

FIG. 3A depicts components of an example image sensor pixel 300 (e.g., corresponding to one of the image sensor pixels 120 of an image sensor 112). In the example shown in FIG. 3A, the image sensor pixel 300 includes a photodiode 302, which can be configured to receive photons to facilitate image capture (e.g., a SPAD). The image sensor pixel 300 shown in FIG. 3A further includes recharge component(s) 304, which are configured to recharge the image sensor pixel 300 after an avalanche event has occurred in the photodiode 302 (e.g., after quenching). The recharge component(s) 304 can reset the photodiode 302 to a high-field state (e.g., by re-applying a high reverse bias voltage) for detection of subsequent avalanche events. In one example, the recharge component(s) 304 include one or more transistors that is/are connected to a recharge clock system 306 of the image sensor (e.g., image sensor 112) of which the image sensor pixel 300 is a part. The transistor(s) can be controlled by a clocked recharge signal from the recharge clock system 306 to recharge the photodiode 302 via electrodes 310 and 312 (which may provide a voltage differential to re-introduce a high reverse bias voltage for the photodiode 302).

In some implementations, rather than utilizing a clocked recharging framework, the recharge component(s) 304 can be adapted for passive recharging of the photodiode 302. For instance, the recharge component(s) 304 can comprise one or more resistors that passively recharge the photodiode 302 via the electrodes 310 and 312 after each avalanche event. In such cases, a recharge clock system 306 may be omitted.

FIG. 3A furthermore depicts the image sensor pixel 300 as including readout circuitry 314, which may be configured to output sensor data for the image sensor pixel 300. The sensor data can comprise an indication of a quantity of avalanche events detected over a time period (e.g., a frame capture time period). The operational timing of the readout circuitry 314 can be controlled by an addressing line 316 of the image sensor 112 of which the image sensor pixel 300 is a part. For instance, the addressing line 316 can comprise a row select line and/or a column select line that selects the image sensor pixel 300 for readout (e.g., according to a predetermined timing framework). The addressing line 316 can thus signal to the readout circuitry 314 when to read out the sensor data for the image sensor pixel 300 (as indicated in FIG. 3A by the arrow extending from the addressing line 316 to the readout circuitry 314). The readout circuitry 314 can output the sensor data to a bit line 318 of the image sensor 112, which can enable communication of the sensor data to other components for use in image formation and/or other applications (as indicated in FIG. 3A by the arrow extending from the readout circuitry 314 to the bit line 318).

The image sensor pixel 300 shown in FIG. 3A includes a switch 320 that is configured to enable or disable the image sensor pixel 300. In the example shown in FIG. 3A, the switch 320 is arranged to disconnect the photodiode 302 from the recharge component(s) 304 to selectively disable the image sensor pixel 300. The switch 320 can be controlled by switch memory 322, as indicated in FIG. 3A by the dashed line extending from the switch memory 322 toward the switch 320. For instance, the switch memory 322 can store a value that is usable to control whether the switch 320 enables or disables the image sensor pixel 300. The value storable by the switch memory 322 can take on any data form, such as a single bit where the switch memory 322 comprises a one-bit memory.

Where the image sensor pixel 300 is a hot pixel, disabling the image sensor pixel 300 via the switch 320 can prevent the image sensor pixel 300 from contributing dark current noise to the imagery output using the image sensor 112 of which the image sensor pixel 300 is a part. Disabling the image sensor pixel 300 can additionally, or alternatively, contribute to reduced power consumption of the image sensor 112 of which the image sensor pixel 300 is a part.

In some instances, output imagery generated by the image sensor 112 when the image sensor pixel 300 is disabled includes a hole or zero value at the pixel position of the image sensor pixel 300. In some instances, a pixel value for the pixel position of the image sensor pixel 300 is determined based on the pixel values of one or more neighboring pixels (e.g., by combining values of neighboring pixels, selecting a median value from among neighboring pixels, copying a value of a neighboring pixel, etc.).

In the example shown in FIG. 3A, the switch memory 322 comprises volatile or re-programmable memory. The switch memory 322 can be configured to receive the value indicating whether to enable or disable the image sensor pixel 300 from image sensor memory 324 of the image sensor 112 of which the image sensor pixel 300 is a part. FIG. 3A illustrates that the switch memory 322 can receive the value from the image sensor memory 324 via the addressing line 316 (as indicated by the arrow extending from the addressing line 316 to the switch memory 322) and/or via the bit line 318 (as indicated by the arrow extending from the bit line 318 to the switch memory 322). Other frameworks for transmitting the value from the image sensor memory 324 to the switch memory 322 are within the scope of the present disclosure.

The value indicating whether to enable or disable the image sensor pixel 300 (and which can be conveyed to the switch memory 322 from the image sensor memory 324) can be stored/maintained by the image sensor memory 324 of the image sensor 112 of which the image sensor pixel 300 is as part. The image sensor memory 324 may store the value for the image sensor pixel 300 in an indexed manner, such that the value is associated with the image sensor pixel 300 (or its pixel position or another attribute) in memory. For instance, each image sensor pixel of the image sensor 112 can include its own set of components similar to those shown in FIG. 3A for the image sensor pixel 300, including a photodiode, recharge component(s), readout circuitry, and a switch and switch memory for selectively disabling the image sensor pixel. The image sensor memory 324 of the image sensor 112 can store values indexed to or associated with each of the individual image sensor pixels of the image sensor 112, and the values for the individual image sensor pixels may be transmitted to the switch memories of the individual image sensor pixels (e.g., via the addressing line 316, the bit line 318, or other means) to indicate whether to selectively activate or deactivate the individual image sensor pixels.

The value indicating whether to enable or disable the image sensor pixel 300 (and/or the values associated with other image sensor pixels) can be determined and/or updated based on various factors, such as dark count signal 326, photon signal 328, ROI 330, or region brightness 332 (illustrated in FIG. 3A in connection with the image sensor memory 324). For instance, the image sensor memory 324 may be part of an overarching system (e.g., system 100, which may be implemented as a mixed-reality head-mounted display 100C, or in another form). The system may include computing resources such as processor(s) 102 and/or storage 104, which the system may use to determine the value associated with enabling or disabling the image sensor pixel 300. The system may use dark count signal 326, photon signal 328, ROI 330, and/or region brightness 332 as a basis for determining the value for enabling or disabling the image sensor pixel 300. After determining the value, the system may cause the value to be transmitted from the image sensor memory 324 to the switch memory 322 (e.g., via the addressing line 316 and/or the bit line 318) to cause the switch 320 to enable or disable the image sensor pixel 300. Similar factors may be used to determine or update the values (stored by the image sensor memory 324) associated with enabling or disabling other image sensor pixels of the image sensor 112.

The dark count signal 326 for the image sensor pixel 300 can comprise an indication of the magnitude or severity of dark current or dark counts exhibited by the image sensor pixel 300. The dark count signal 326 can be determined based on information acquired as part of calibration or testing of the image sensor 112. For instance, under test conditions, the image sensor 112 may be covered to prevent photons from reaching the photodiodes thereof. An image may be captured while the image sensor 112 is covered to indicate which pixels read out dark counts (e.g., resulting from avalanche events caused by dark current). Such information can indicate the dark count signal 326 for the image sensor pixel 300. The dark count signal 326 for the image sensor pixel 300 can be obtained or updated based on imagery captured during end use of the image sensor 112 of which the image sensor pixel 300 is a part. For example, template matching or other image signal processing techniques may be performed using imagery captured by the image sensor 112 to determine which pixels or pixel clusters exhibit dark count characteristics, as well as the severity of such characteristics.

The photon signal 328 may be determined in association with at least part of an image capture environment. For instance, the photon signal 328 may be based on ambient light conditions, which may be indicated by a light sensor (e.g., a single pixel camera of the system 100 of which the image sensor 112 is a part), gain settings applied by the image sensor 112, intensity or other pixel values measured by a set or subset of pixels (e.g., neighboring pixels), global or local histogram analysis, and/or others. The value for enabling or disabling the image sensor pixel 300 may be determined based on a comparison of the dark count signal 326 and the photon signal 328. For example, when the dark count signal 326 exceeds the photon signal 328, the value in the image sensor memory 324 for enabling/disabling the image sensor pixel 300 may be set to cause the switch 320 to selectively disable the image sensor pixel 300. In contrast, when the photon signal 328 exceeds the dark count signal 326, the value in the image sensor memory 324 for enabling/disabling the image sensor pixel 300 may be set to cause the switch 320 to selectively enable the image sensor pixel 300.

The ROI 330 can comprise a region or part of captured imagery (or an image capture environment) to which user attention is directed (or estimated to be directed). For instance, where the image sensor 112 is used to capture pass-through images, the ROI 330 can comprise the part of the output imagery that the user is estimated to be focused on, gazing toward, looking at, interested in, etc. The ROI 330 can be determined in various ways, such as by performing eye tracking, assessing user gestures (e.g., whether the user is pointing toward a part of the scene), and/or other techniques. In some instances, whether the image sensor pixel 300 is positioned within the ROI 330 (or whether the ROI 330 encompasses the pixel position of the image sensor pixel 300) can influence the value for enabling/disabling the image sensor pixel 300 via the switch 320. For instance, when the image sensor pixel 300 is within the ROI 330, the image sensor pixel 300 may be selectively enabled to increase the image resolution within the ROI 330. In contrast, when the image sensor pixel 300 is outside of the ROI 330, the image sensor pixel 300 may be selectively disabled.

The region brightness 332 associated with the image sensor pixel 300 can comprise the brightness of a region of imagery captured via the image sensor 112 that spatially encompasses the image sensor pixel 300. For instance, the region can comprise a pixel window centered on the image sensor pixel 300, and the region brightness 332 can comprise a measure of the brightness (or intensity) of the pixels within the pixel window. The region brightness 332 for the image sensor pixel 300 may be determined using various image signal processing techniques, such as pixel averaging, thresholding, histogram analysis, and/or other methods for a region of pixels. The region brightness 332 associated with the image sensor pixel 300 can influence the value for enabling/disabling the image sensor pixel 300 via the switch 320. For instance, when the region brightness 332 is high enough to limit the ability of users to resolve features within the region, the image sensor pixel 300 may be selectively disabled. In contrast, when the region brightness 332 is in a range that permits user perception of features within the region, the image sensor pixel 300 may be selectively enabled.

The dark count signal 326, photon signal 328, ROI 330, and/or region brightness 332 may be used independently or in combination to determine the value governing whether to disable or enable the image sensor pixel 300 via the switch 320. For instance, when the image sensor pixel 300 is determined to be a hot pixel, the dark count signal 326 and the photon signal 328 may have priority in determining whether to enable or disable the image sensor pixel 300. When the image sensor pixel 300 is not a hot pixel, the ROI 330 and/or the region brightness 332 may have priority in determining whether to enable or disable the image sensor pixel 300. The dark count signal 326, photon signal 328, ROI 330, and/or region brightness 332 associated with the image sensor pixel 300 may be updated throughout use of the image sensor 112. Correspondingly, the value for enabling/disabling the image sensor pixel 300 via the switch 320 may be updated throughout use of the image sensor 112.

In some implementations, the image sensor pixel 300 can be selectively disabled after a threshold number of photon counts is reached by the image sensor pixel 300 over a frame capture time period. For instance, sensor data read out for the image sensor pixel 300 via the readout circuitry 314 can indicate the number of photon counts for the image sensor pixel 300 over a frame capture time period. The switch memory 322 may be set with a value for disabling the image sensor pixel 300 via the switch 320 after the number of photon counts read out for the image sensor pixel 300 satisfies the threshold. A value for re-enabling the image sensor pixel 300 via the switch 320 may then be set in the switch memory 322 for the subsequent frame capture time period, allowing the image sensor pixel 300 to again generate photon counts until the applicable photon count threshold is satisfied by the image sensor pixel 300, at which point the image sensor pixel 300 can again be selectively deactivated. The image sensor pixel 300 can thus be selectively enabled and disabled with sub-frame timing. The sensor data for the image sensor pixel 300 provided via the readout circuitry 314 may be received by one or more off-pixel components (e.g., the image sensor 112 of which the image sensor pixel 300 is a part, or componentry of the overall system 100) to determine when the photon count threshold is satisfied, which may then trigger setting of the value in the switch memory 322 (and/or the image sensor memory 324) for disabling the image sensor pixel 300. In some implementations, the sensor data for the image sensor pixel 300 provided via the readout circuitry 314 is communicated directly to the switch memory 322 to trigger setting of the value in the switch memory 322 for disabling the image sensor pixel 300 after the photon count threshold is satisfied by the image sensor pixel 300 (indicated in FIG. 3A via the arrow extending from the readout circuitry 314 to the switch memory 322). In some implementations, the photon count threshold for selectively disabling the image sensor pixel 300 is determined/changeable based on the dark count signal 326, photon signal 328, ROI 330, region brightness 332, and/or other factors. In some instances, the photon count threshold is hard-coded or fixed (e.g., based on imaging conditions in which the image sensor pixel is expected to be implemented during end use). Such functionality for selectively disabling the image sensor pixel 300 after a photon count threshold is satisfied by the image sensor pixel 300 over a frame capture time period can enable a tradeoff between power and/or noise reduction and the photon gathering capability of the image sensor pixel 300 (and the image sensor 112 of which the image sensor pixel 300 is a part).

Figure 3B:
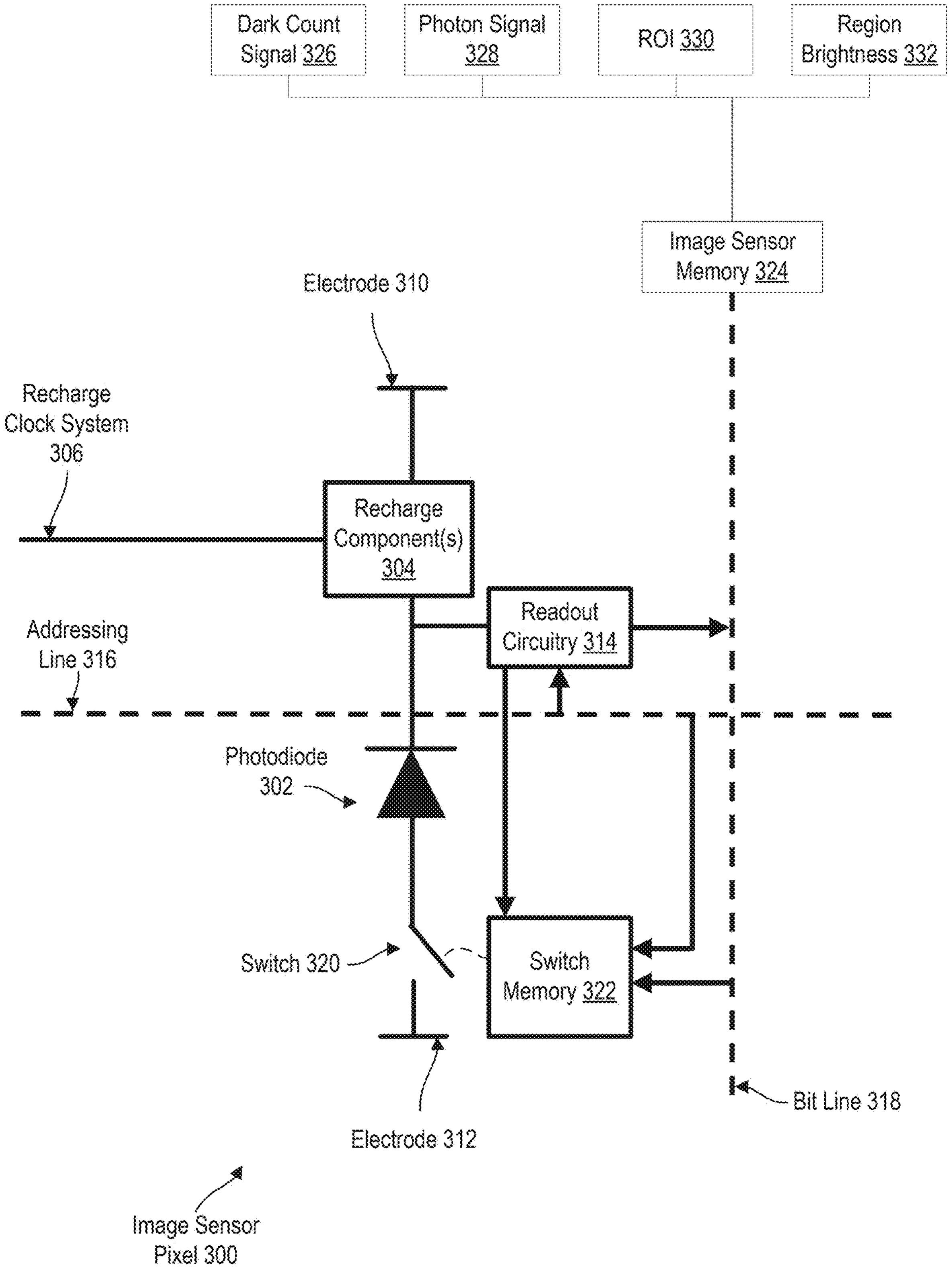
Figure 3C:
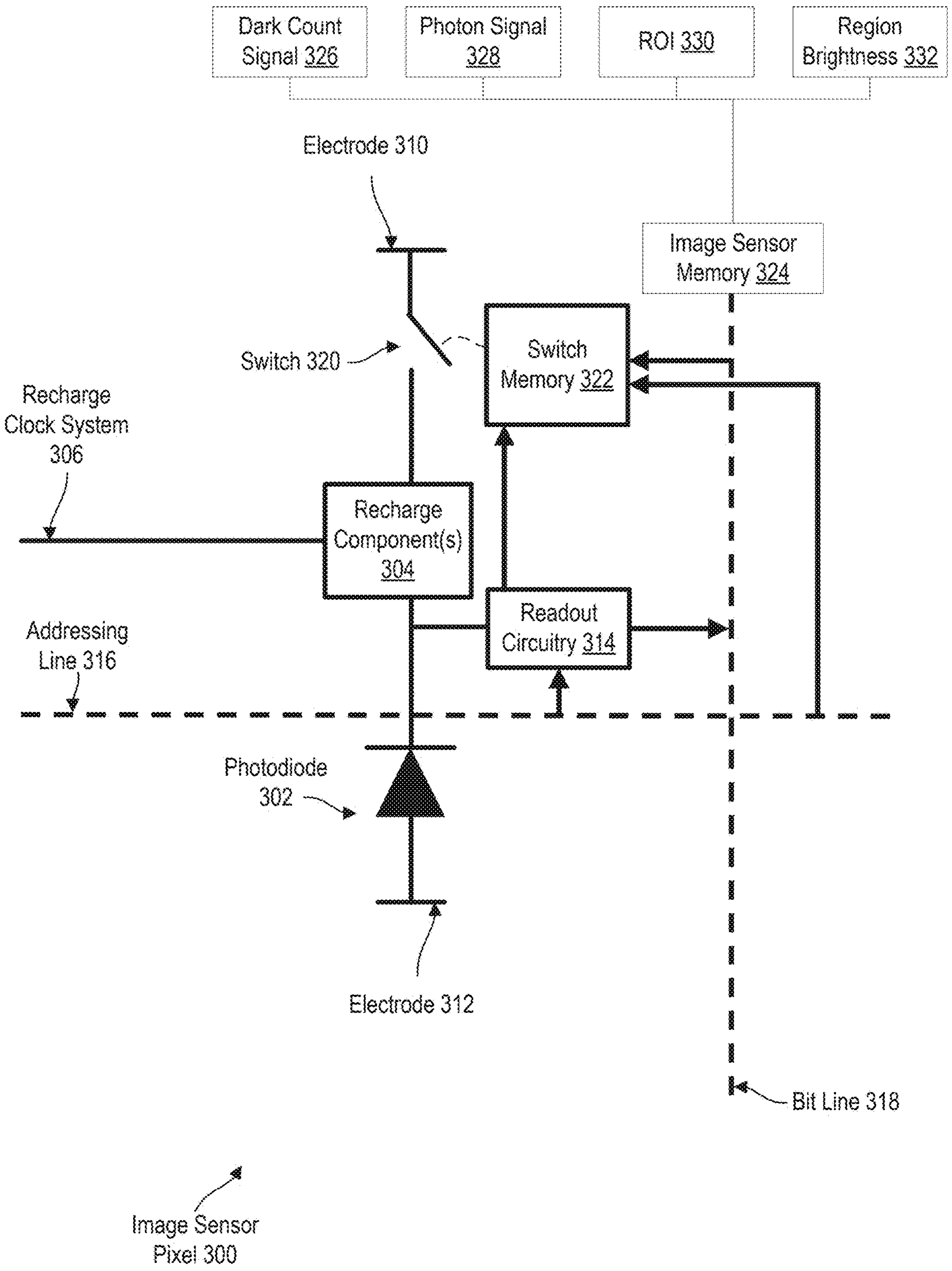
Figure 3D:
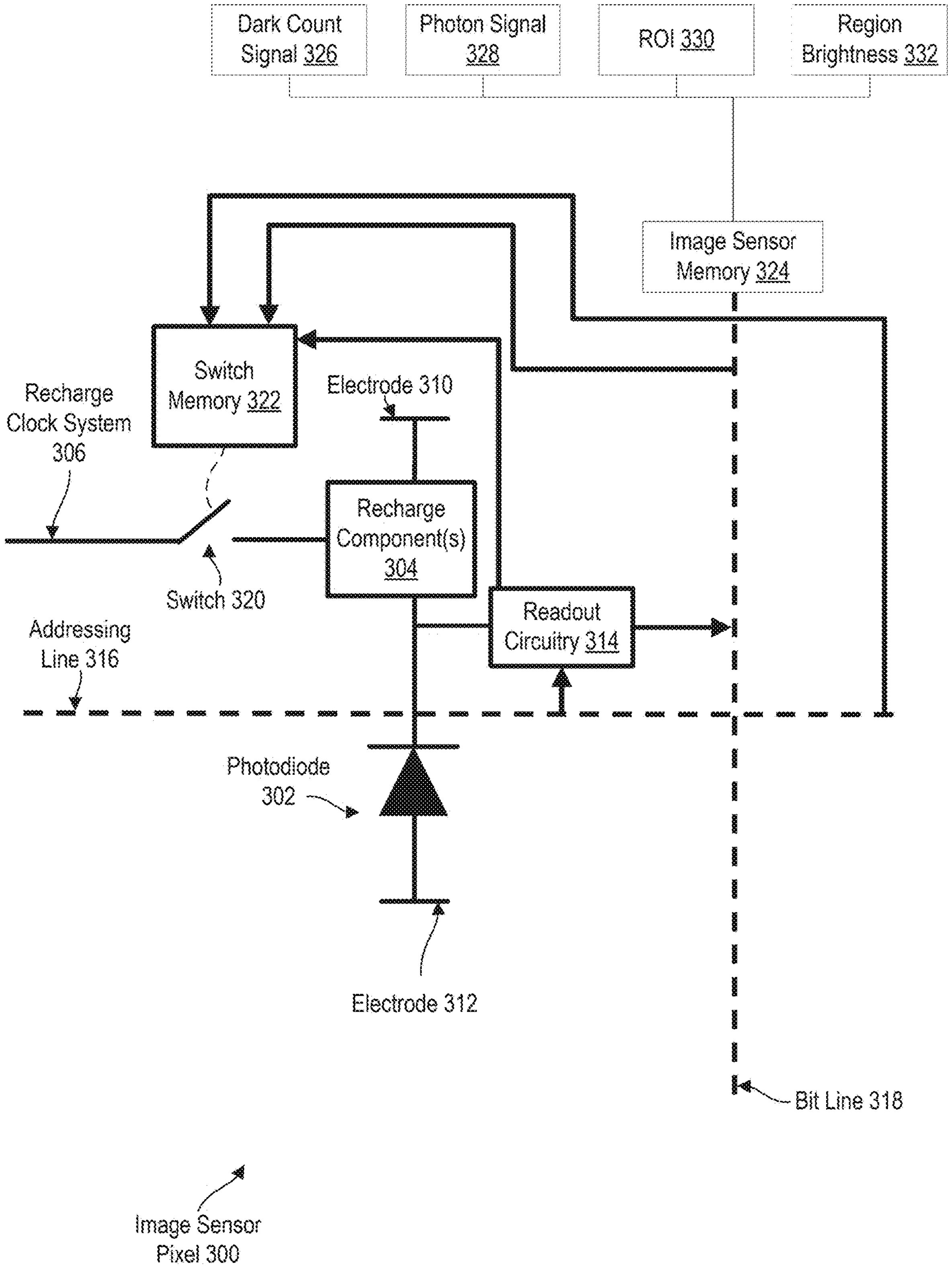

Although FIG. 3A illustrates an example in which the switch 320 can selectively disable the image sensor pixel 300 by disconnecting the photodiode 302 from the recharge component(s) 304, other configurations for the switch 320 are possible. For instance, FIGS. 3B and 3C illustrate configurations for the image sensor pixel 300 in which the switch 320 is arranged to disconnect voltage sources (e.g., supply voltage) from the image sensor pixel 300 to selectively disable the image sensor pixel 300. FIG. 3B illustrates the switch 320 positioned to disconnect the image sensor pixel 300 from electrode 312, whereas FIG. 3C illustrates the switch 320 positioned to disconnect the image sensor pixel 300 from electrode 310. As another example, FIG. 3D illustrates a configuration for the image sensor pixel 300 in which the switch 320 is arranged to disconnect the recharge component(s) 304 from the recharge clock system 306 of the image sensor 112 of which the image sensor pixel 300 is a part.

FIGS. 3A through 3D focus on an example in which the switch memory 322 is reprogrammable to permit selective enabling and disabling of the image sensor pixel 300 based on operational conditions. As noted above, a switch memory for controlling a switch to enable or disable an individual pixel of an image sensor may comprise one-time-programmable memory, permitting a value to be set in the switch memory (e.g., during production, manufacturing, testing, calibration, etc.) to govern whether the individual pixel is disabled or enabled for the life of the image sensor.

Figure 4A:
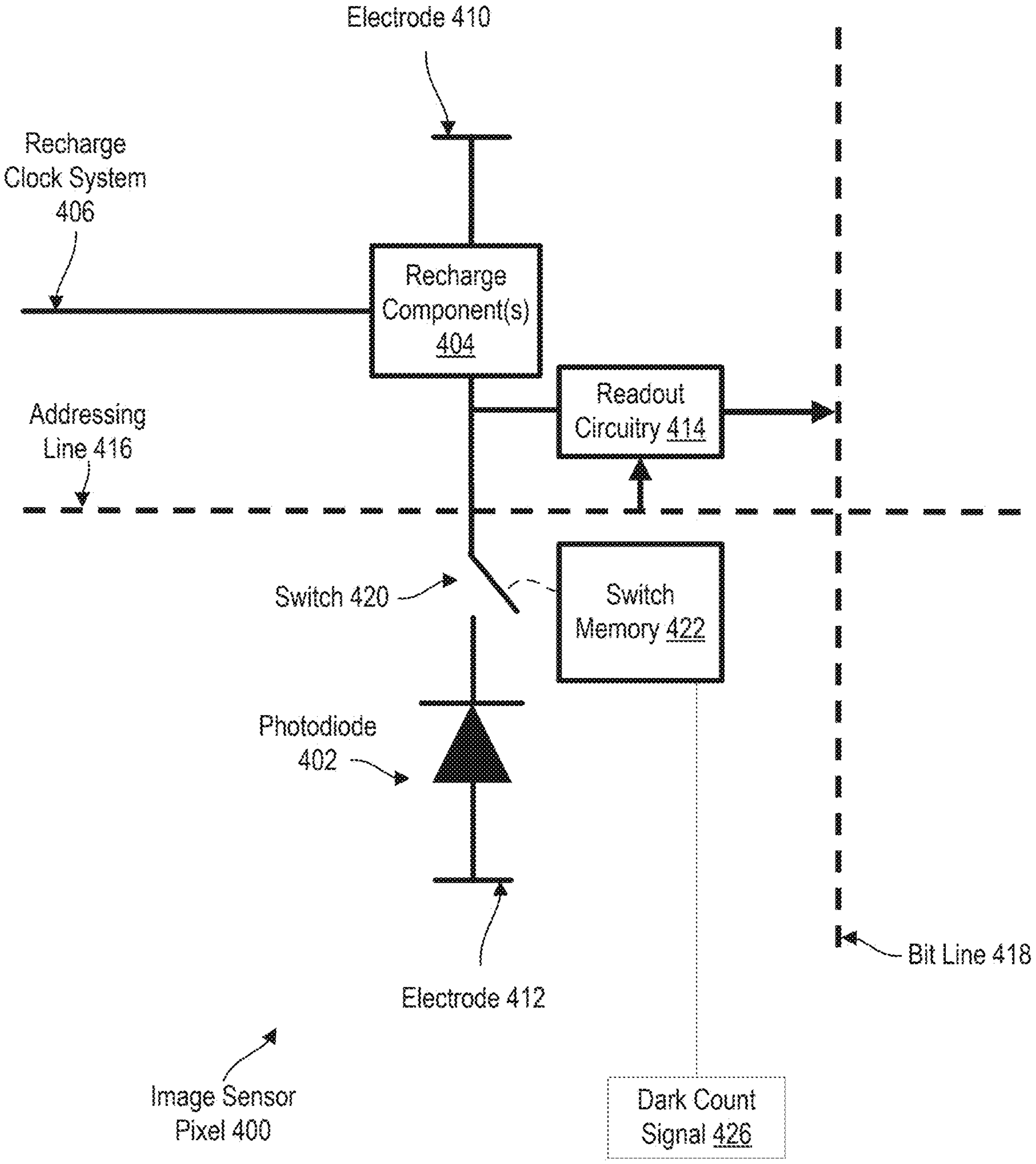
FIGS. 4A through 4D illustrate example diagrams showing components of image sensor pixels of an image sensor that can be disabled based on performance of the image sensor pixels under test conditions.

FIG. 4A depicts example components of an image sensor pixel 400 (e.g., corresponding to one of the image sensor pixels 120 of an image sensor 112). The image sensor pixel 400 shown in FIG. 4A includes components similar to those shown in FIGS. 3A through 3D, including a photodiode 402, recharge component(s) 404 connected to a recharge clock system 406 (e.g., to control recharging via electrodes 410 and 412), readout circuitry 414 (e.g., controllable via the addressing line 416 to provide sensor data to the bit line 418), a switch 420, and switch memory 422. Similar to FIG. 3A, the switch 420 is configured to disable the image sensor pixel 400 by disconnecting the recharge component(s) 404 from the photodiode 402.

In the example shown in FIG. 4A, the switch memory 422 is non-volatile memory (e.g., 1-bit one-time-programmable memory). The switch memory 422 can be configured to store a value that controls the switch 420 to disable or enable the image sensor pixel 400. The value stored by the switch memory 422 can be determined based on the dark count signal 426 associated with the image sensor pixel 400 (as indicated in FIG. 4A by the line connecting the dark count signal 426 to the switch memory 422). The dark count signal 426 can comprise an indication of the quantity of dark counts (or the magnitude of dark current) exhibited by the image sensor pixel 400. The dark count signal 426 can be generated by the image sensor pixel 400 under test conditions (e.g., using automatic test equipment during production of the image sensor pixel 400), such as by performing shutter operations while photons are prevented from reaching the photodiode 402 (e.g., while a cover is on the image sensor 112 of which the image sensor pixel 400 is a part). If the dark count signal 426 for the image sensor pixel 400 satisfies (e.g., meets or exceeds) a dark count threshold, a value may be set in the switch memory 422 that causes the switch 420 to disable the image sensor pixel 400 (e.g., permanently, or for the functional life of the image sensor pixel 400 or the image sensor 112). The dark count threshold can be selected based on the imaging conditions (e.g., lighting conditions) in which the image sensor pixel 400 is expected to be implemented during end use. If the dark count signal 426 for the image sensor pixel 400 fails to satisfy the dark count threshold, a value may be set in the switch memory 422 that causes the switch 420 to enable the image sensor pixel 400 (e.g., permanently). Each individual image sensor pixel of an image sensor (e.g., image sensor 112) may include a switch and switch memory as described with reference to FIG. 4A, enabling each individual pixel to be either enabled or disabled (via hardcoding) based on its respective dark current signal.

Figure 4B:
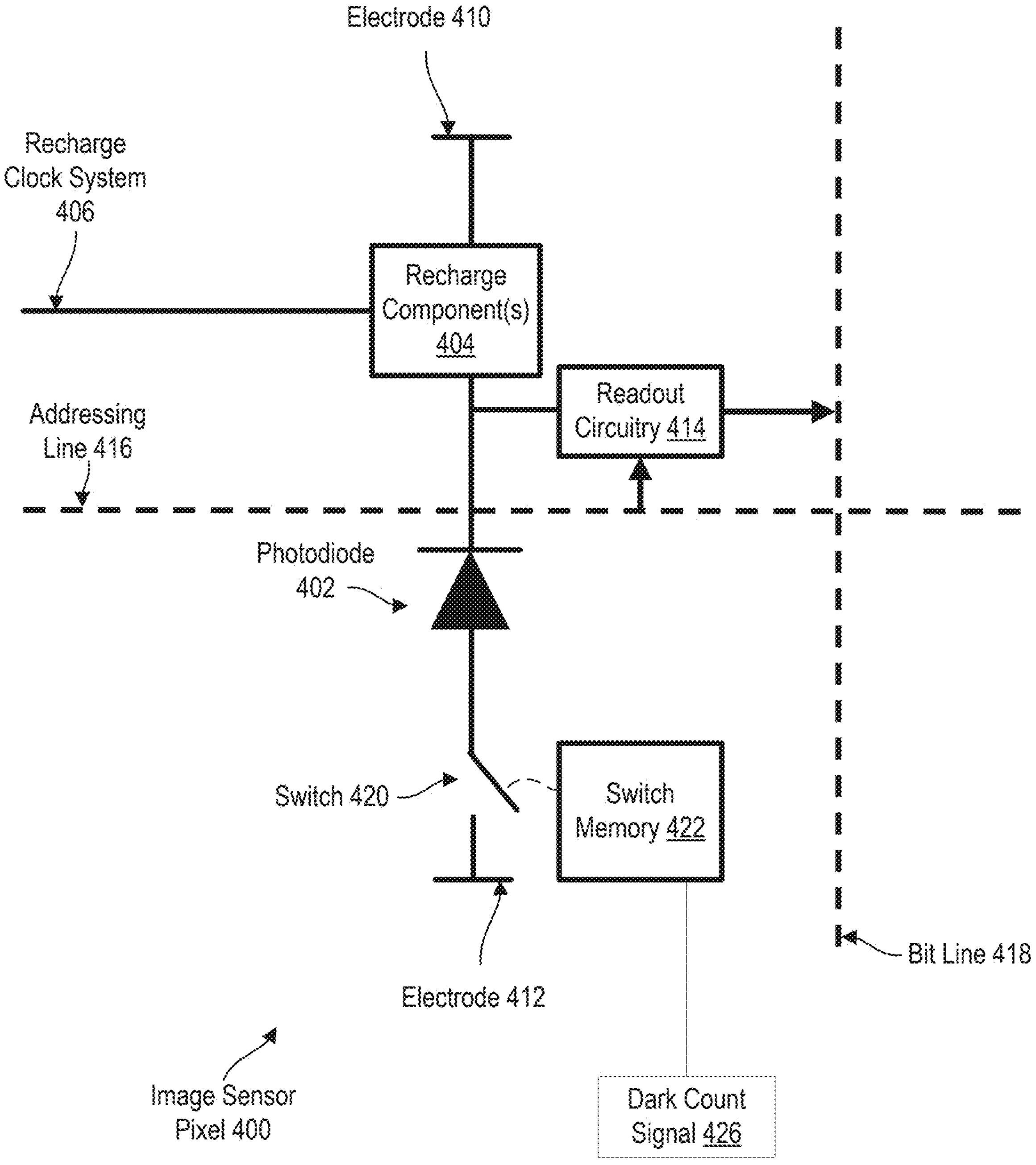
Figure 4C:
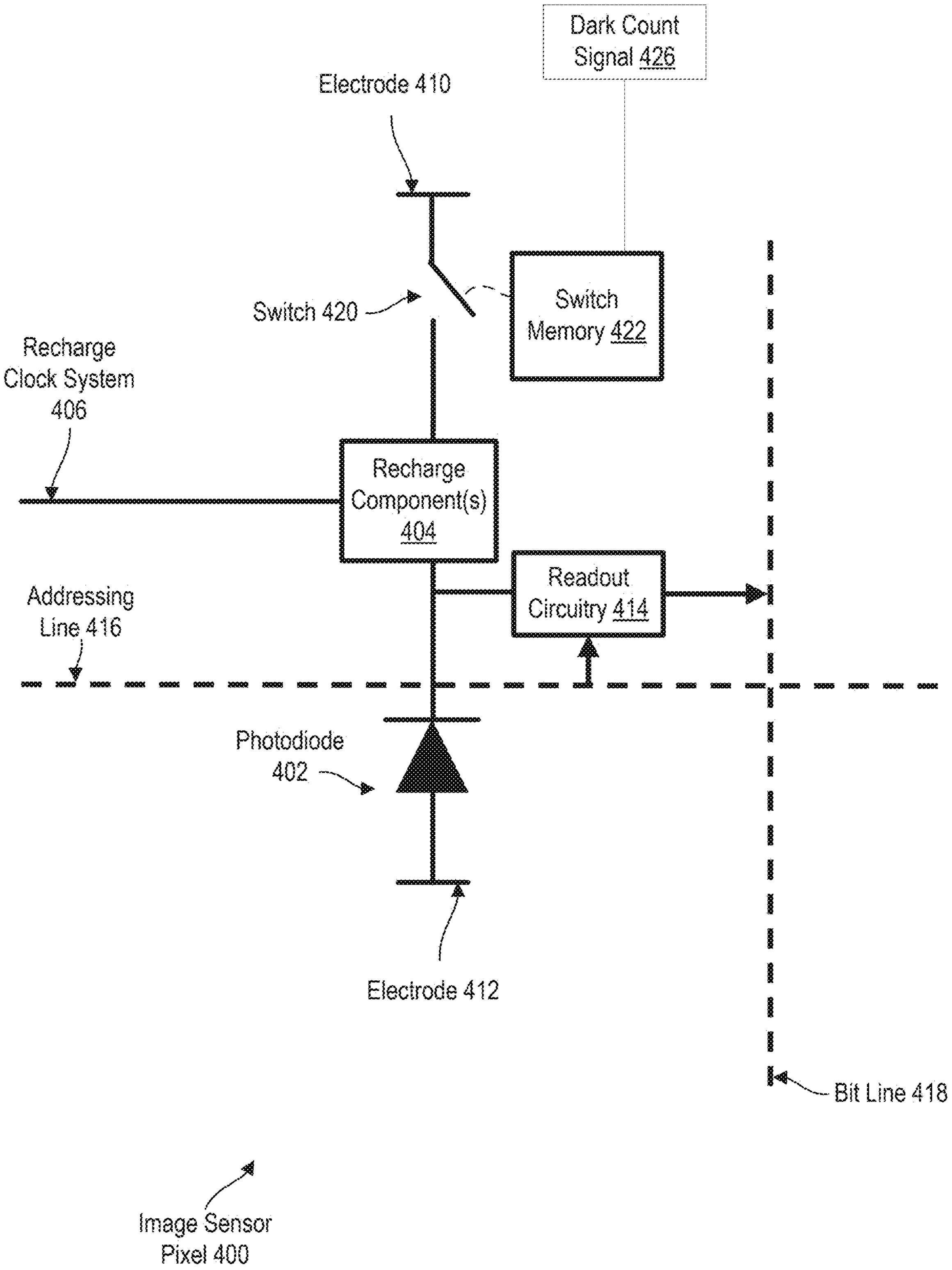
Figure 4D:
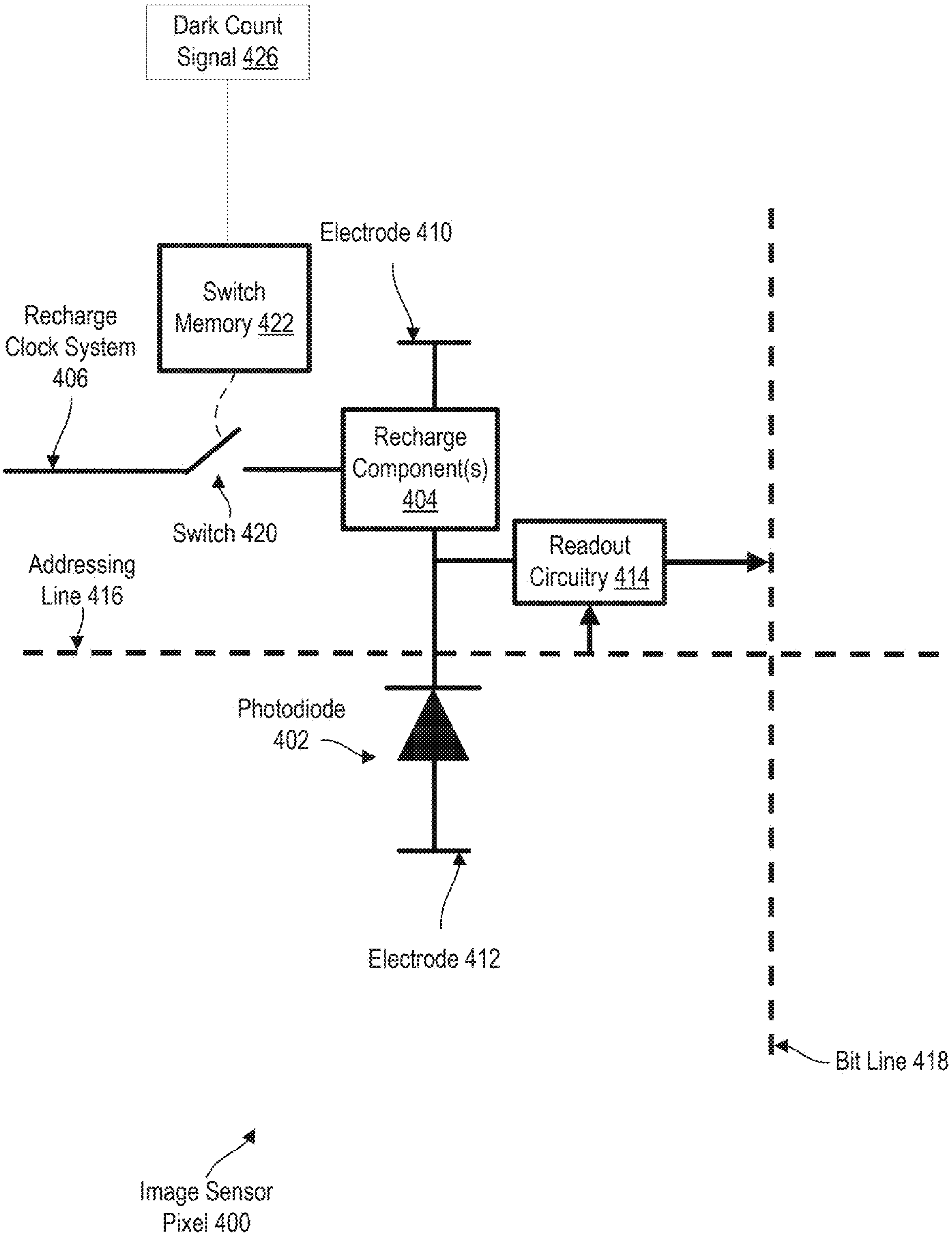

Although FIG. 4A illustrates an example in which the switch 420 can disable the image sensor pixel 400 by disconnecting the photodiode 402 from the recharge component(s) 404, other configurations for the switch 420 are possible. For instance, FIGS. 4B and 4C illustrate configurations for the image sensor pixel 400 in which the switch 420 is arranged to disconnect voltage sources (e.g., supply voltage) from the image sensor pixel 400 to selectively disable the image sensor pixel 400. FIG. 4B illustrates the switch 420 positioned to disconnect the image sensor pixel 400 from electrode 412, whereas FIG. 4C illustrates the switch 420 positioned to disconnect the image sensor pixel 400 from electrode 410. As another example, FIG. 4D illustrates a configuration for the image sensor pixel 400 in which the switch 420 is arranged to disconnect the recharge component(s) 404 from the recharge clock system 406 of the image sensor 112 of which the image sensor pixel 400 is a part.

Additional Details Related to Implementing the Disclosed Embodiments

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. An image sensor configured to capture imagery with mitigated dark current noise or reduced power consumption, the image sensor comprising:
- a plurality of image sensor pixels arranged to form a sensor array;
- one or more addressing lines connected to the plurality of image sensor pixels to facilitate selection of one or more image sensor pixels of the plurality of image sensor pixels for readout; and
- one or more bit lines connected to the plurality of image sensor pixels to facilitate communication of sensor data during readout, wherein at least one image sensor pixel of the plurality of image sensor pixels comprises:
  - a photodiode configured to receive photons to facilitate image capture;
  - one or more recharge components configured to recharge the at least one image sensor pixel;
  - readout circuitry configured to output sensor data for the at least one image sensor pixel to the one or more bit lines when the at least one image sensor pixel is selected for readout via the one or more addressing lines;
  - a switch configured to enable or disable the at least one image sensor pixel; and
  - a switch memory configured to store a value that controls whether the switch enables or disables the at least one image sensor pixel, wherein disabling the at least one image sensor pixel via the switch contributes to mitigated dark current noise or reduced power consumption for the image sensor, wherein the value storable by the switch memory is determined based on a comparison of (i) dark count signal associated with the at least one image sensor pixel and (ii) a photon signal associated with the image sensor, wherein the dark count signal is updated throughout operation of the image sensor.

2. The image sensor of claim 1, wherein the one or more addressing lines comprise one or more row select lines or one or more column select lines.

3. The image sensor of claim 1, wherein the value is set in the switch memory based on a dark count signal generated by the at least one image sensor pixel under test conditions.

4. The image sensor of claim 1, wherein the switch memory comprises non-volatile memory.

5. The image sensor of claim 1, wherein the switch is configured to disable the at least one image sensor pixel by: (i) disconnecting the one or more recharge components from the photodiode of the at least one image sensor pixel, (ii) disconnecting the one or more recharge components of the at least one image sensor pixel from a recharge clock system of the image sensor, (iii) disconnecting a supply voltage from the at least one image sensor pixel.

6. The image sensor of claim 1, wherein each particular image sensor pixel of the plurality of image sensor pixels comprises:
- a respective photodiode configured to receive photons to facilitate image capture;
- one or more respective recharge components configured to recharge the particular image sensor pixel;
- respective readout circuitry configured to output sensor data for the particular image sensor pixel to the one or more bit lines when the particular image sensor pixel is selected for readout via the one or more addressing lines;
- a respective switch configured to enable or disable the particular image sensor pixel; and
- a respective switch memory configured to store a respective value that controls whether the respective switch enables or disables the particular image sensor pixel.

7. An image sensor configured to capture imagery with mitigated dark current noise or reduced power consumption, the image sensor comprising:
- a plurality of image sensor pixels arranged to form a sensor array;
- one or more addressing lines connected to the plurality of image sensor pixels to facilitate selection of one or more image sensor pixels of the plurality of image sensor pixels for readout;
- one or more bit lines connected to the plurality of image sensor pixels to facilitate communication of sensor data during readout; and
- an image sensor memory configured to store a value indicating whether to enable or disable at least one image sensor pixel of the plurality of image sensor pixels, wherein the at least one image sensor pixel comprises:

a photodiode configured to receive photons to facilitate image capture;

one or more recharge components configured to recharge the at least one image sensor pixel;

readout circuitry configured to output sensor data for the at least one image sensor pixel to the one or more bit lines when the at least one image sensor pixel is selected for readout via the one or more addressing lines;

a switch configured to enable or disable the at least one image sensor pixel; and a switch memory configured to receive and store the value from the image sensor memory, wherein the value controls whether the switch enables or disables the at least one image sensor pixel, wherein disabling the at least one image sensor pixel via the switch contributes to mitigated dark current noise or reduced power consumption for the image sensor, wherein the value storable by the image sensor memory is determined based on: (i) a region of interest associated with at least part of an image capture environment or (ii) a scene brightness associated with one or more regions of one or more images captured via the image sensor.

8. The image sensor of claim 7, wherein the one or more addressing lines comprise one or more row select lines or one or more column select lines.

9. The image sensor of claim 7, wherein the value storable by the image sensor memory is determined based on a comparison of a dark count signal associated with the at least one image sensor pixel and a photon signal associated with at least part of an image capture environment.

10. The image sensor of claim 9, wherein the dark count signal or the photon signal are updated throughout operation of the image sensor.

11. The image sensor of claim 7, wherein the switch memory comprises volatile memory.

12. The image sensor of claim 7, wherein the switch memory is configured to receive the value from the image sensor memory via the one or more addressing lines or the one or more bit lines.

13. The image sensor of claim 7, wherein the switch is configured to disable the at least one image sensor pixel by: (i) disconnecting the one or more recharge components from the photodiode of the at least one image sensor pixel, (ii) disconnecting the one or more recharge components of the at least one image sensor pixel from a recharge clock system of the image sensor, (iii) disconnecting a supply voltage from the at least one image sensor pixel.

14. The image sensor of claim 7, wherein the image sensor memory is configured to store a plurality of values including a respective value for each of the plurality of image sensor pixels, wherein each respective value indicates whether to enable or disable a respective image sensor pixel of the plurality of image sensor pixels.

15. The image sensor of claim 14, wherein each respective image sensor pixel of the plurality of image sensor pixels comprises:

a respective photodiode configured to receive photons to facilitate image capture;

one or more respective recharge components configured to recharge the respective image sensor pixel;

respective readout circuitry configured to output sensor data for the respective image sensor pixel to the one or more bit lines when the respective image sensor pixel is selected for readout via the one or more addressing lines;

a respective switch configured to enable or disable the respective image sensor pixel; and a respective switch memory configured to receive and store the respective value from the image sensor memory, wherein the respective value controls whether the respective switch enables or disables the respective image sensor pixel.

16. A system configured to capture imagery with mitigated dark current noise or reduced power consumption, the system comprising:

an image sensor, comprising:

a plurality of image sensor pixels arranged to form a sensor array;

one or more addressing lines connected to the plurality of image sensor pixels to facilitate selection of one or more image sensor pixels of the plurality of image sensor pixels for readout;

one or more bit lines connected to the plurality of image sensor pixels to facilitate communication of sensor data during readout; and an image sensor memory configured to store a value indicating whether to enable or disable at least one image sensor pixel of the plurality of image sensor pixels, wherein the at least one image sensor pixel comprises:

a photodiode configured to receive photons to facilitate image capture;

one or more recharge components configured to recharge the at least one image sensor pixel;

readout circuitry configured to output sensor data for the at least one image sensor pixel to the one or more bit lines when the at least one image sensor pixel is selected for readout via the one or more addressing lines;

a switch configured to enable or disable the at least one image sensor pixel; and a switch memory configured to receive and store the value from the image sensor memory, wherein the value controls whether the switch enables or disables the at least one image sensor pixel, wherein disabling the at least one image sensor pixel via the switch contributes to mitigated dark current noise or reduced power consumption for the image sensor;

one or more processors; and one or more computer-readable recording media that store instructions that are executable by the one or more processors to configure the system to:

determine the value and cause storage of the value by the image sensor memory, wherein the value is determined based on: (i) a region of interest associated with at least part of an image capture environment or (ii) a scene brightness associated with one or more regions of one or more images captured via the image sensor; and cause transmission of the value from the image sensor memory to the switch memory to cause the switch to enable or disable the at least one image sensor pixel.

17. The system of claim 16, wherein the instructions are executable by the one or more processors to configure the system to determine the value based on a comparison of a dark count signal associated with the at least one image sensor pixel and a photon signal associated with at least part of an image capture environment.

18. The system of claim 17, wherein the dark count signal or the photon signal are updated throughout operation of the system.

* * * * *